June 10, 1958  KUNIHIKO HORI  2,837,957
LENS HOOD
Filed March 14, 1956
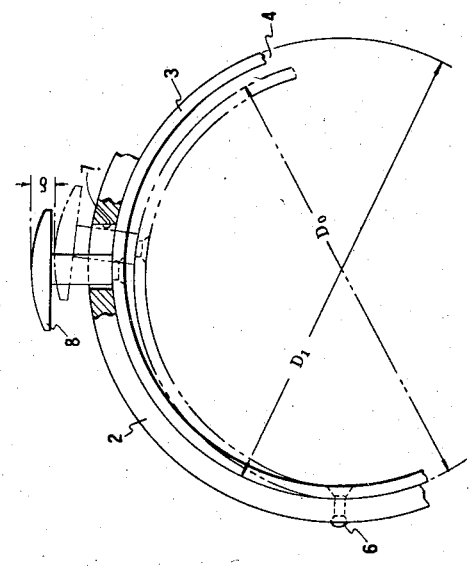
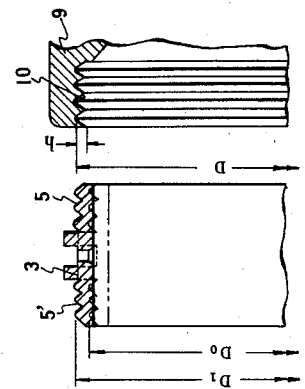
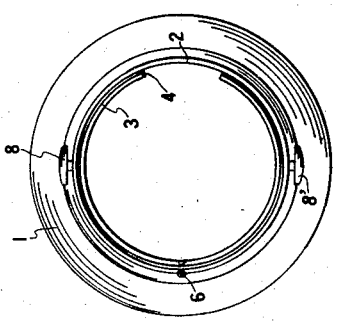
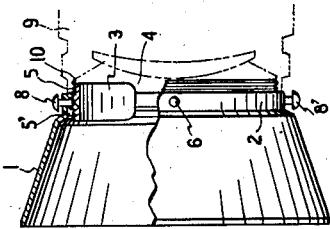
INVENTOR.
KUNIHIKO HORI
BY
ATTORNEY United States Patent Office 2,837,957
Patented June 10, 1958

2,837,957
LENS HOOD

Kunihiko Hori, Setagayaku, Tokyo, Japan, assignor to Nippon Kogaku K. K., Shinagawaku, Tokyo, Japan, a corporation of Japan Application March 14, 1956, Serial No. 571,505

4 Claims. (Cl. 88—1)

This invention relates to improved means for attaching lens hoods to optical instruments such as cameras.

Prior known means for attaching lens hoods to cameras are of various types such as:

(1) The insertion type: In spite of its merit of being readily detachable, it has the disadvantage of requiring a substantially long inserting length to secure steady holding thereof, since it is not steady and liable to drop out even as the result of slight vibration.

(2) The screw-in type: While it does attach securely it has the disadvantage of taking appreciable time to fix or detach, accompanied by frequent too tight screwing thereby causing difficulty and eventually stripping the thread to the detriment to the internal mechanism of the optical instruments themselves. Furthermore, it is difficult to know the accurate relative axial direction of the fixing members.

(3) The spring type: While it has the merit of readily being attached and detached, in view of the fact that the support is merely by means of the elasticity of a spring, even a slight vibration would readily cause the hood to drop off due to the liability of its weak securing device slipping away. Furthermore, frequent spring trouble is encountered with this type.

The lens hood of the instant invention eliminates all the shortcomings and disadvantages of prior known lens hoods and facilitates quick, accurate and secure attachment thereof by the use of a detachable elastic ring having a circumferential gap or split and provided with ridges or furrows running concentrically with the ring on its outer circumferential surface so as to permit of accurate attachment to the body of the optical instrument by engaging said ridges or furrows by means of the spring action of the ring in the radial direction with corresponding furrows or ridges provided on the inner circumferential surface of the cylindrical portion of the optical instrument to which the hood is to be attached.

A clearer concept of the scope and purpose of this invention may be obtained from the following description, taken in connection with the attached drawing illustrating an embodiment according to this invention, in which:

Fig. 1 shows a partially sectioned side view of a camera provided with a lens hood according to this invention;

Fig. 2 shows a front view of Fig. 1;

Fig. 3 shows an enlarged partial sectional front view of a part of the essential portion; and Fig. 4 shows a detailed sectional view of a part of the attaching means.

In Figs. 1 and 2, 1 is a lens hood having at its smaller base small flange 2 provided with an elastic ring 3 for attachment to the camera objective lens. The elastic ring 3 has a portion 4 of its periphery cut away to provide a circumferential gap, and is provided with external circumferential ridges or furrows 5 and 5' concentric with the axis of the elastic ring on the front and rear portions of the elastic ring. The elastic ring 3 is affixed by a rivet 6 to the flange 2 of the hood 1 at a region thereof diametrically opposite substantially the midpoint of the gap or cut-away portion 4 so that elasticity is imparted to both free ends of the elastic ring 3, and push-buttons 8 and 8' are affixed to the elastic ring at diametrically opposite portions of the elastic ring along a diameter at about 90° from the place of attachment of rivet 6, the push buttons passing through elongated circumferential aperture 7 in flange 2. 9 is the lens frame of an optical instrument, for instance a camera, provided with internal circumferential furrows or ridges 10 corresponding to, and adapted to engage with external threads 5, 5' of elastic ring 3.

In using the hood of the instant invention, it will be noted that on depressing push-buttons 8 and 8' when attaching the lens hood, the elastic ring 3 the diameter thereof is reduced pivotally on the rivet 6 as shown in chain line in Figs. 3 and 4. In this condition, when the push-buttons 8 and 8' are released, threads 5 and 10 engage each other, thus obtaining secure attachment of the hood to the camera. The elastic ring 3, it will be noted, is threaded externally at both of its axial ends, the threading 5 and 5' at each end being of an axial length about equal to the axial length of the internal threading 10 of the camera lens frame 9. By this expedient the hood 1 may be attached to the lens with equal facility in the normal position, that is the hood flaring outwardly away from the camera lens, or in reversed position with the hood flaring toward the camera.

Since this invention offers a mechanism, as demonstrated by the described illustrative embodiment to compress both free ends of the elastic ring by operating the push-button to reduce its outer diameter thus moving inwardly its externally threaded surface which, by its reverting force, securely and exactly engage, due to the elasticity of the ring when the external and internal threads mesh under the restoring force of the elastic ring, the undeformed diameter $D_1$ from tip to tip of the external threads on the elastic ring being equal to the diameter $D$ from bottom to bottom of the internal threads in the lens supporting frame. The push buttons must then have a minimum depressibility $d$ so that $D_0 < D - 2h$, where $D_0$ is the external diameter of the ring when compressed, as shown in Fig. 3, by depressing the buttons an amount $d$ for engaging the external threads of the elastic ring to the internal threads of the lens supporting frame, and $h$ is the depth of the internal threads in the lens supporting frame.

As noted from the above, this invention demonstrates a specific function and effect in so offering as a prompt and accurate handling with ease of attaching lens hoods and to permit the use of hoods attachable to different outer shape when the diameter and pitch are similar without any trouble to process on the shape of the hoods and no necessity to limit the direction of their attachment.

What I claim is:

1. A lens hood for attachment to the internally threaded lens supporting frame of an optical instrument comprising a flaring hood, a cylindrical flange integral with the hood end of the smaller diameter, an elastic ring having a circumferential gap therein and affixed at a region substantially intermediate its free ends to and within the flange, threading on the external circumferential surface of the elastic ring, the flange having at least one elongated aperture therethrough at a region thereof spaced from the region at which the elastic ring is affixed to the flange and spaced from the free ends of the elastic ring, and a push-button extending through the elongated aperture of the flange and attached to a free end region of the elastic ring so that on depressing the push-button the diameter of the elastic ring is decreased sufficiently that the elastic ring may enter the threaded end of the lens supporting frame and on release of the push-button the external threading of the elastic ring meshes with the internal threading of the lens frame.

2. A lens hood according to claim 1 in which the flange is provided with two elongated apertures at diametrically opposite regions thereof, and each aperture is provided with a push-button extending through the aperture and is affixed to opposite free end regions of the elastic ring.

3. A lens hood according to claim 1 in which the elastic ring is of an axial length greater than the axial length of the flange and each axial end region of the ring is externally threaded a distance substantially equal to the distance the lens supporting frame is internally threaded.

4. A lens hood for attachment to the internally threaded lens supporting frame of an optical device comprising a hood, a cylindrical flange integral with the smaller hood end and of an outer diameter substantially equal to the outer diameter of the lens supporting frame, an elastic ring having a gap therein attached at substantially its mid-circumferential region to and within the flange, the elastic ring having an outer diameter substantially equal to the inner diameter of the lens supporting frame and being of an axial width in excess of twice that to which the lens supporting frame is internally threaded, external threading at each axial end of the elastic ring for a distance equal to the distance the lens supporting frame is threaded and adapted to mesh with the lens supporting frame threading, the flange having a pair of diametrically opposite elongated circumferential apertures therethrough and positioned circumferentially substantially mid-way between the point of attachment of the elastic ring and the free ends of the elastic ring, and a push-button extending through each of the apertures and attached to the elastic ring so that on depressing both push-buttons the diameter of the elastic ring may be inserted into the threaded end of the lens supporting frame from each axial end of the elastic end and on release of the push-buttons the external threading of the elastic ring at the inserted axial end engages the internal threading of the internal threading of the lens supporting frame and latches the hood in normal, respectively reversed, position thereto.

References Cited in the file of this patent

UNITED STATES PATENTS 2,510,873    Early    June 6, 1950